(12) United States Patent
Ohta

(10) Patent No.: US 12,513,611 B2
(45) Date of Patent: Dec. 30, 2025

(54) COMMUNICATION DEVICE AND COMMUNICATION SYSTEM

(71) Applicant: 1FINITY Inc., Kawasaki (JP)

(72) Inventor: Yoshiaki Ohta, Yokohama (JP)

(73) Assignee: 1FINITY Inc., Kawasaki (JP)

( * ) Notice: Subject to any disclaimer, the term of this patent is extended or adjusted under 35 U.S.C. 154(b) by 319 days.

(21) Appl. No.: 18/077,308

(22) Filed: Dec. 8, 2022

(65) Prior Publication Data

US 2023/0097492 A1 Mar. 30, 2023

Related U.S. Application Data

(63) Continuation of application No. PCT/JP2020/024699, filed on Jun. 24, 2020.

(51) Int. Cl.
*H04W 48/18* (2009.01)
*H04W 72/231* (2023.01)
*H04W 88/10* (2009.01)
H04W 88/06 (2009.01)

(52) U.S. Cl.
CPC ......... *H04W 48/18* (2013.01); *H04W 72/231* (2023.01); *H04W 88/10* (2013.01); *H04W 88/06* (2013.01)

(58) Field of Classification Search
CPC ... H04W 72/231; H04W 88/06; H04W 88/10; H04W 48/18
See application file for complete search history.

(56) References Cited

U.S. PATENT DOCUMENTS

| 6,542,516 B1* | 4/2003 | Vialen ............... H04L 9/40 370/335 |
| 2007/0104218 A1 | 5/2007 | Hassan et al. |
| 2011/0244874 A1 | 10/2011 | Fodor et al. |
| 2015/0055572 A1 | 2/2015 | Ishikura et al. |
| 2015/0282067 A1 | 10/2015 | Zhu et al. |
| 2019/0215750 A1* | 7/2019 | Xu ............... H04W 48/16 |

(Continued)

FOREIGN PATENT DOCUMENTS

| JP | 2003-87856 A | 3/2003 |
| JP | 2009-515487 A | 4/2009 |
| JP | 2012-511863 A | 5/2012 |

(Continued)

OTHER PUBLICATIONS

Geng et al., "Cell Handover Method, User Equipment, and Network Device", Feb. 22, 2018, WO, WO 2018033136 (Year: 2018).*

(Continued)

*Primary Examiner* — Michael K Phillips
(74) *Attorney, Agent, or Firm* — Myers Wolin, LLC

(57) ABSTRACT

A communication device includes, a first wireless communication layer and a second wireless communication layer, each of the first wireless communication layer and the second wireless communication layer being compliant with a first communication standard and a second communication standard, a controller that selects respective communication standards for the first wireless communication layer and the second wireless communication layer on the basis of communication standards of the first wireless communication layer and the second wireless communication layer, with each of which the other communication device is compliant.

13 Claims, 8 Drawing Sheets

(56) References Cited

U.S. PATENT DOCUMENTS

| | | | | |
|---|---|---|---|---|
| 2021/0153087 A1* | 5/2021 | Lee | ............... | H04W 36/08 |
| 2022/0232437 A1* | 7/2022 | Kim | ............... | H04W 36/305 |

FOREIGN PATENT DOCUMENTS

| | | | | |
|---|---|---|---|---|
| JP | 2013-197820 A | 9/2013 | | |
| JP | 2017-514327 A | 6/2017 | | |
| WO | 2013/001483 A1 | 1/2013 | | |
| WO | WO-2018031135 A1 * | 2/2018 | | |
| WO | WO-2018033136 A1 * | 2/2018 | ............... | H04W 36/00 |

OTHER PUBLICATIONS

Notice of Reasons for Refusal issued by the Japan Patent Office for corresponding Japanese Patent Application No. 2022-531295, mailed on Mar. 26, 2024, with an English machine translation.

3GPP TS 36.133 V16.5.0, 3rd Generation Partnership Project; Technical Specification Group Radio Access Network; Evolved Universal Terrestrial Radio Access (E-UTRA); Requirements for support of radio resource management (Release 16), Mar. 2020.

3GPP TS 36.300 V16.1.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", Mar. 2020.

3GPP TS 36.211 V16.1.0, "3rd Generation Partnership Project; Technical Specification Group Radio Access Network; Evolved Universal Terrestrial Radio Access (E-UTRA); Physical channels and modulation (Release 16)", Mar. 2020.

3GPP TS 36.212 V16.1.0, "3rd Generation Partnership Project; Technical Specification Group Radio Access Network; Evolved Universal Terrestrial Radio Access (E-UTRA); Multiplexing and channel coding (Release 16)", Mar. 2020.

3GPP TS 36.213 V16.1.0, "3rd Generation Partnership Project; Technical Specification Group Radio Access Network; Evolved Universal Terrestrial Radio Access (E-UTRA); Physical layer procedures (Release 16)", Mar. 2020.

3GPP TS 36.214 V16.0.0, "3rd Generation Partnership Project; Technical Specification Group Radio Access Network; Evolved Universal Terrestrial Radio Access (E-UTRA); Physical layer; Measurements (Release 16)", Dec. 2019.

3GPP TS 36.321 V16.0.0, "3rd Generation Partnership Project; Technical Specification Group Radio Access Network; Evolved Universal Terrestrial Radio Access (E-UTRA); Medium Access Control (MAC) protocol specification (Release 16)", Mar. 2020.

3GPP TS 36.322 V15.3.0, "3rd Generation Partnership Project; Technical Specification Group Radio Access Network; Evolved Universal Terrestrial Radio Access (E-UTRA); Radio Link Control (RLC) protocol specification (Release 15)", Sep. 2019.

3GPP TS 36.323 V16.0.0, "3rd Generation Partnership Project; Technical Specification Group Radio Access Network; Evolved Universal Terrestrial Radio Access (E-UTRA); Packet Data Convergence Protocol (PDCP) specification (Release 16)", Mar. 2020.

3GPP TS 36.331 V16.0.0, "3rd Generation Partnership Project; Technical Specification Group Radio Access Network; Evolved Universal Terrestrial Radio Access (E-UTRA); Radio Resource Control (RRC); Protocol specification (Release 16)", Mar. 2020.

3GPP TS 36.413 V16.1.0, "3rd Generation Partnership Project; Technical Specification Group Radio Access Network; Evolved Universal Terrestrial Radio Access Network (E-UTRAN); S1 Application Protocol (S1AP) (Release 16)", Mar. 2020.

3GPP TS 36.423 V16.1.0, "3rd Generation Partnership Project; Technical Specification Group Radio Access Network; Evolved Universal Terrestrial Radio Access Network (E-UTRAN); X2 application protocol (X2AP) (Release 16)", Mar. 2020.

3GPP TS 36.425 V15.0.0, "3rd Generation Partnership Project; Technical Specification Group Radio Access Network; Evolved Universal Terrestrial Radio Access Network (E-UTRAN); X2 interface user plane protocol (Release 15)", Jun. 2018.

3GPP TR 36.912 V15.0.0, "3rd Generation Partnership Project; Technical Specification Group Radio Access Network; Feasibility study for Further Advancements for E-UTRA (LTE-Advanced) (Release 15)" Jun. 2018, with Link budget templates for indoor test environment (indoor hotspot deployment scenario), Annex C1 Characteristics template, Compliance template for services 1, TR 36.912 Annex A3: Self evaluation results, and RP-090998: Extract of 3GPP Release 8 Specifications.

3GPP TR 38.913 V15.0.0, "3rd Generation Partnership Project; Technical Specification Group Radio Access Network; Study on Scenarios and Requirements for Next Generation Access Technologies; (Release 15)", Jun. 2018.

3GPP TR 38.801 V14.0.0, "3rd Generation Partnership Project; Technical Specification Group Radio Access Network; Study on new radio access technology: Radio access architecture and interfaces (Release 14)", Mar. 2017.

3GPP TR 38.802 V14.2.0, "3rd Generation Partnership Project; Technical Specification Group Radio Access Network; Study on New Radio Access Technology Physical Layer Aspects (Release 14)", Sep. 2017.

3GPP TR 38.803 V14.2.0, "3rd Generation Partnership Project; Technical Specification Group Radio Access Network; Study on new radio access technology: Radio Frequency (RF) and co-existence aspects (Release 14)", Sep. 2017.

3GPP TR 38.804 V14.0.0, "3rd Generation Partnership Project; Technical Specification Group Radio Access Network; Study on New Radio Access Technology; Radio Interface Protocol Aspects (Release 14)", Mar. 2017.

3GPP TR 38.900 V15.0.0, "3rd Generation Partnership Project; Technical Specification Group Radio Access Network; Study on channel model for frequency spectrum above 6 GHz (Release 15)", Jun. 2018.

3GPP TS 38.300 V16.1.0, "3rd Generation Partnership Project; Technical Specification Group Radio Access Network; NR; NR and NG-RAN Overall Description; Stage 2 (Release 16)", Mar. 2020.

3GPP TS 37.340 V16.1.0, "3rd Generation Partnership Project; Technical Specification Group Radio Access Network; Evolved Universal Terrestrial Radio Access (E-UTRA) and NR; Multi-connectivity; Stage 2 (Release 16)", Mar. 2020.

3GPP TS 38.201 V16.0.0, "3rd Generation Partnership Project; Technical Specification Group Radio Access Network; NR; Physical layer; General description (Release 16)", Dec. 2019.

3GPP TS 38.202 V16.0.0, "3rd Generation Partnership Project; Technical Specification Group Radio Access Network; NR; Services provided by the physical layer (Release 16)", Dec. 2019.

3GPP TS 38.211 V16.1.0, "3rd Generation Partnership Project; Technical Specification Group Radio Access Network; NR; Physical channels and modulation (Release 16)", Mar. 2020.

3GPP TS 38.212 V16.1.0, "3rd Generation Partnership Project; Technical Specification Group Radio Access Network; NR; Multiplexing and channel coding (Release 16)", Mar. 2020.

3GPP TS 38.213 V16.1.0, "3rd Generation Partnership Project; Technical Specification Group Radio Access Network; NR; Physical layer procedures for control (Release 16)", Mar. 2020.

3GPP TS 38.214 V16.1.0, "3rd Generation Partnership Project; Technical Specification Group Radio Access Network; NR; Physical layer procedures for data (Release 16)", Mar. 2020.

3GPP TS 38.215 V16.1.0, 3rd Generation Partnership Project; Technical Specification Group Radio Access Network; NR; Physical layer measurements (Release 16), Mar. 2020.

3GPP TS 38.321 V16.0.0, "3rd Generation Partnership Project; Technical Specification Group Radio Access Network; NR; Medium Access Control (MAC) protocol specification (Release 16)", March, 2020.

3GPP TS 38.322 V16.0.0, "3rd Generation Partnership Project; Technical Specification Group Radio Access Network; NR; Radio Link Control (RLC) protocol specification (Release 16)", Mar. 2020.

3GPP TS 38.323 V16.0.0, "3rd Generation Partnership Project; Technical Specification Group Radio Access Network; NR; Packet Data Convergence Protocol (PDCP) specification (Release 16)", Mar. 2020.

(56) References Cited

OTHER PUBLICATIONS

3GPP TS 37.324 V16.0.0, "3rd Generation Partnership Project; Technical Specification Group Radio Access Network; E-UTRA and NR; Service Data Adaptation Protocol (SDAP) specification (Release 16)", Mar. 2020.
3GPP TS 38.331 V16.0.0, "3rd Generation Partnership Project; Technical Specification Group Radio Access Network; NR; Radio Resource Control )RRC) protocol specification (Release 16)", Mar. 2020.
3GPP TS 38.401 V16.1.0, "3rd Generation Partnership Project; Technical Specification Group Radio Access Network; NG-RAN; Architecture description (Release 16)", Mar. 2020.
3GPP TS 38.410 V16.1.0, "3rd Generation Partnership Project; Technical Specification Group Radio Access Network; NG-RAN; NG general aspects and principles (Release 16)", Mar. 2020.
3GPP TS 38.413 V16.1.0, "3rd Generation Partnership Project; Technical Specification Group Radio Access Network; NG-RAN; NG Application Protocol (NGAP) (Release 16)", Mar. 2020.
3GPP TS 38.420 V15.2.0, "3rd Generation Partnership Project; Technical Specification Group Radio Access Network; NG-RAN; Xn general aspects and principles (Release 15)", Dec. 2018.
3GPP TS 38.423 V16.1.0, "3rd Generation Partnership Project; Technical Specification Group Radio Access Network; NG-RAN; Xn application protocol (XnAP) (Release 16)", Mar. 2020.
3GPP TS 38.470 V16.1.0, "3rd Generation Partnership Project; Technical Specification Group Radio Access Network; NG-RAN; F1 general aspects and principles (Release 16)", Mar. 2020.
3GPP TS 38.473 V16.1.0, "3rd Generation Partnership Project; Technical Specification Group Radio Access Network; NG-RAN; F1 application protocol (F1AP) (Release 16)", Mar. 2020.
3GPP TS 36.300 V16.0.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16)", Dec. 2019.
International Search Report and Written Opinion of the International Searching Authority issued by the Japan Patent Office for corresponding International Patent Application No. PCT/JP2020/024699, mailed on Aug. 25, 2020, with a partial English translation.
Notice of Reasons for Refusal issued by the Japan Patent Office for corresponding Japanese Patent Application No. 2022-531295, mailed on Nov. 28, 2023, with an English machine translation.

* cited by examiner

| Bit | CONTENT |
|---|---|
| 5-TH BIT | L1 5G |
| 6-TH BIT | L1 B5G |
| 7-TH BIT | L2 5G |
| 8-TH BIT | L2 B5G |

FIG. 6

| Index | L1 | L2 |
|---|---|---|
| 0(0x00) | 5G | 5G |
| 1(0x01) | 5G | B5G |
| 2(0x10) | B5G | 5G |
| 3(0x11) | B5G | B5G |

FIG. 7

COMMUNICATION DEVICE AND COMMUNICATION SYSTEM

CROSS-REFERENCE TO RELATED APPLICATION

This application is a continuation application of International Application Number PCT/JP2020/024699 filed on Jun. 24, 2020 and designated the U.S., the entire contents of which are incorporated herein by reference.

FIELD

The present disclosure relates to a communication device and a communication system

BACKGROUND

In current networks, traffic of mobile terminals (smartphones and future phones) accounts for most of network resources. In addition, there is a trend that traffic used by the mobile terminals continuously increases.

Meanwhile, with the development of IoT (Internet of things) and V2X services (for instance, transportation systems, smart meters, monitoring systems for devices, and the like), there is a demand for coping with services that have various needs. Therefore, in the communication standard for the fifth-generation mobile communication (5G or NR (New Radio)), technologies that implement a higher data rate, a greater capacity, and a lower delay are needed in addition to the 4G (the fourth-generation mobile communication) standard technologies (e.g., 3GPP TS36.133 V16.5.0 LTE-A Radio Measurement Specification, 3GPP TS36.300 V16.0.0 LTE-A Overall Specification, 3GPP TS36.211 V16.1.0 LTE-A PHY Channel Specification, 3GPP TS36.212 V16.1.0 LTE-A PHY Coding Specification, 3GPP TS36.213 V16.1.0 LTE-A PHY Procedure Specification, 3GPP TS36.214 V16.0.0 LTE-A PHY Measurement Specification, 3GPP TS36.321 V16.0.0 LTE-A MAC Specification, 3GPP TS36.322 V15.3.0 LTE-A RLC Specification, 3GPP TS36.323 V16.0.0 LTE-A PDCP Specification, 3GPP TS36.331 V16.0.0 LTE-A RRC Specification, 3GPP TS36.413 V16.1.0 LTE-A 51 Specification, 3GPP TS36.423 V16.1.0 LTE-A X2 Specification, 3GPP TS36.425 V15.0.0 LTE-A Xn Specification, 3GPP TR36.912 V15.0.0 NR Radio Access Overview, 3GPP TR38.913 V15.0.0 NR Requirements, 3GPP TR38.801 V14.0.0 NR Network Architecture Overview, 3GPP TR38.802 V14.2.0 NR PHY Overview, 3GPP TR38.803 V14.2.0 NR RF Overview, 3GPP TR38.804 V14.0.0 NR L2 Overview, 3GPP TR38.900 V15.0.0 NR High Frequency Overview, 3GPP TS38.300 V16.1.0 NR Overall Specification, 3GPP TS37.340 V16.1.0 NR Multi-Connectivity Overall Specification, 3GPP TS38.201 V16.0.0 NR PHY Specification General Specification, 3GPP TS38.202 V16.0.0NR PHY Service General Specification, 3GPP TS38.211 V16.1.0 NR PHY Channel Specification, 3GPP TS38.212 V16.1.0 NR PHY Coding Specification, 3GPP TS38.213 V16.1.0 NR PHY Data Channel Procedure Specification, 3GPP TS38.214 V16.1.0 NR PHY Control Channel Procedure Specification, 3GPP TS38.215 V16.1.0 NR PHY Measurement Specification, 3GPP TS38.321 V16.0.0 NR MAC Specification, 3GPP TS38.322 V16.0.0 NR RLC Specification, 3GPP TS38.323 V16.0.0 NR PDCP Specification, 3GPP TS37.324 V16.0.0 NR SDAP Specification, 3GPP TS38.331 V16.0.0 NR RRC Specification, 3GPP TS38.401 V16.1.0 NR Architecture General Specification, 3GPP TS38.410 V16.1.0 NR Core Network General Specification, 3GPP TS38.413 V16.1.0 NR Core Network AP Specification, 3GPP TS38.420 V15.2.0 NR Xn Interface General Specification, 3GPP TS38.423 V16.1.0 NR XnAP Specification, 3GPP TS38.470 V16.1.0 NR F1 Interface General Specification, and 3GPP TS38.473 V16.1.0 NR F1AP Specification).

In communication standards for wireless communication systems, specifications are generally defined as protocol stacks (referred to also as hierarchical protocols) in which wireless communication functions are divided into a sequence of layers.

Technologies related to 5G are described in the above-mentioned related art documents.

CITATION LIST

Patent Literature

PTL1: Japanese Translation of PCT Application No. 2012-511863
PTL2: Japanese Patent Application Publication No. 2003-087856

SUMMARY

However, the standardization of the communication standards will continue beyond 5G into the next generation (e.g., B5G (Beyond 5G) and 6G). A protocol configuration of a communication standard is changed with each generation (communication generation). For instance, protocol configurations in a second layer (layer 2) and a first layer (layer 1) may considerably change. When communication devices (a terminal device and a base station device) are individually developed in each of the generations in order to respond to these protocol configuration changes, a construction period becomes lengthy to also increase development cost. In next-generation communication, multi-generation communication devices are pluralistically connected to be able to perform communication. While communication statuses in a plurality of communication devices or in communication areas provided by the communication devices fluctuate, it becomes difficult to appropriately configure protocols or layers. As a result, a communication system as a whole is not possibly be able to provide maximum communication characteristics.

A communication device includes, a first wireless communication layer and a second wireless communication layer, each of the first wireless communication layer and the second wireless communication layer being compliant with a first communication standard and a second communication standard, a communicator that performs wireless communication with another communication device via the first wireless communication layer; and a controller that selects respective communication standards for the first wireless communication layer and the second wireless communication layer on the basis of communication standards of the first wireless communication layer and the second wireless communication layer, with each of which the other communication device is compliant, and controls communication such that data transmission/reception is performed using the first wireless communication layer and the second wireless communication layer which are compliant with the selected communication standards.

The object and advantages of the disclosure will be realized and attained by means of the elements and combinations particularly pointed out in the claims.

It is to be understood that both the foregoing general description and the following detailed description are exemplary and explanatory and are not restrictive of the disclosure.

BRIEF DESCRIPTION OF DRAWINGS

FIG. 6 is a figure illustrating an example of the bit pattern representing the correspondence relationships between the supported generations and layers.

FIG. 7 is a figure illustrating an example of the bit pattern representing correspondence relationships between the generations and layers that are to be used.

DESCRIPTION OF EMBODIMENTS

Figure 1:
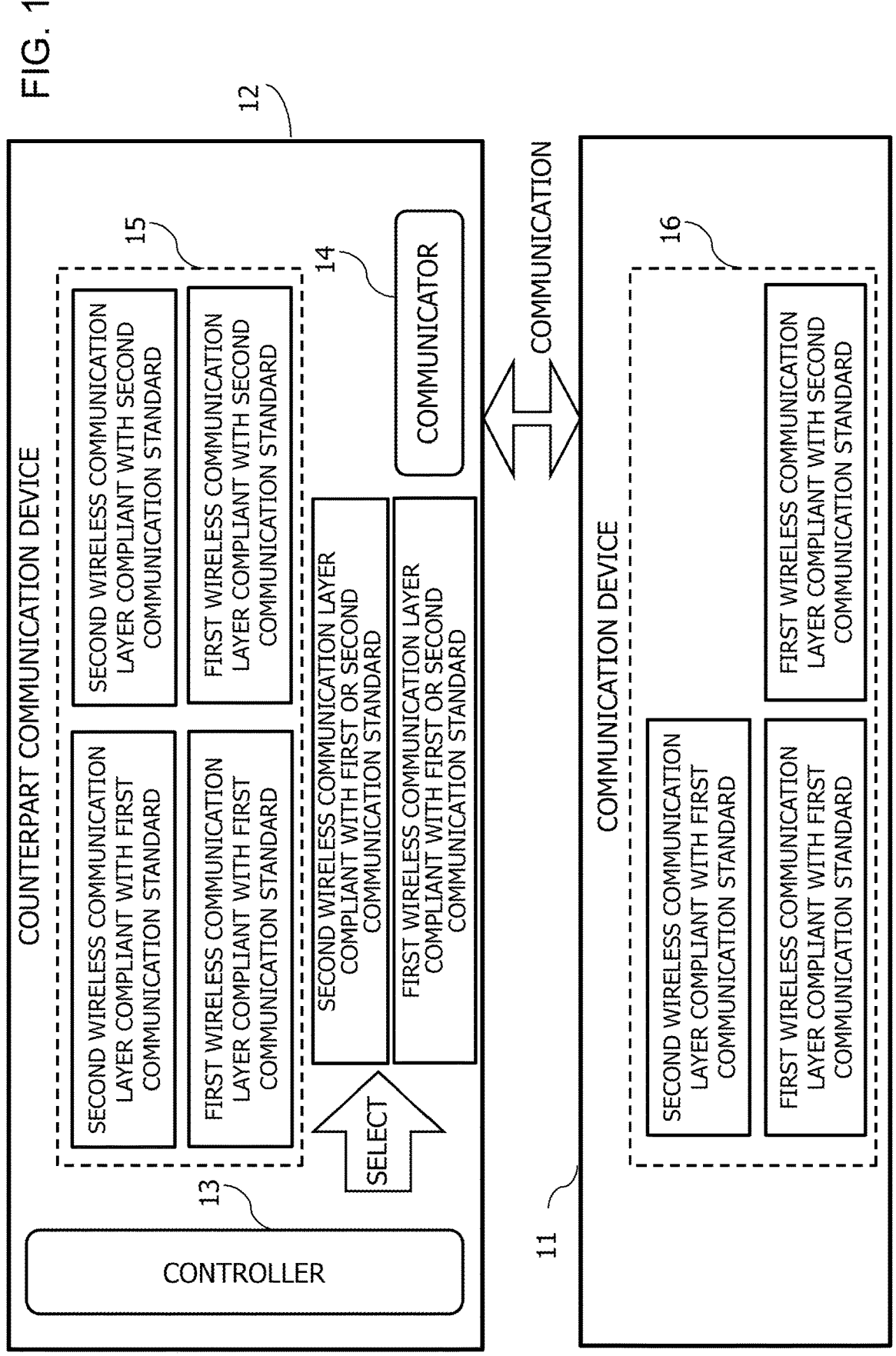
FIG. 1 is a figure illustrating an example of a configuration of a communication system 2.

Referring to the drawings, a detailed description will be given below of the present embodiment. Problems and embodiments in the present specification are mere examples, and are not intended to limit the scope of rights of the present application. In particular, as long as the described expressions are technologically equivalent even when different described expressions are used, the technologies of the present application may be applicable, and the scope of rights is not limited thereby.

First Embodiment

A description will be given of a first embodiment.

FIG. 1 is a figure illustrating an example of a configuration of a communication system 2. The communication system 2 is a system which has a communication device 11 and a counterpart (another) communication device 12, and performs communication including data transmission/reception between the device 11 and the device 12.

The device 12 has a controller 13 and a communicator 14. Each of the entities is built through execution of a program by a computer (processor) included in the device 12.

The device 12 has a first wireless communication layer and a second wireless communication layer, which is typically an n-th wireless communication layer (n is an integer of not less than 1). The first wireless communication layer and the second wireless communication layer, which is typically the n-th wireless communication layer (n is an integer of not less than 1), are respectively compliant with (support) a first communication standard and a second communication standard, which is typically an m-th wireless communication standard (m is an integer of not less than 1). The communication standards are compliant with, e.g., communication generations in standardization. The communication standards may also be interpreted as protocol versions.

The device 11 performs communication with the device 12. The communication is, e.g., wireless communication. The device 11 has the first wireless communication layer and the second wireless communication layer, which is typically the n-th wireless communication layer (n is an integer of not less than 1). Each of the first wireless communication layer and the second wireless communication layer, which is typically the n-th wireless communication layer (n is an integer of not less than 1), is compliant with at least one of the first communication standard and the second communication standard, which is typically the m-th wireless communication standard (m is an integer of not less than 1). In the example in FIG. 1, the first wireless communication layer is compliant with the first and second communication standards, while the second wireless communication layer is compliant with the first communication standard.

The controller 13 selects, within a compliant group 15 of the layers and communication standards with which the host device is compliant, each the first wireless communication layer and the second wireless communication layer to be used for communication on the basis of a compliant group 16 the layers and communication standards with which the device 11 is compliant. The controller 13 selects, e.g., the second wireless communication layer compliant with the first communication standard and the first wireless communication layer compliant with the second communication standard, which are included in the compliant group 16 of the device 11.

Under the control of the controller 13, the communicator 14 uses the first wireless communication layer and the second wireless communication layer each selected by the controller 13 to perform communication with the device 11 via the first wireless communication layer.

As a result, when, e.g., the second communication standard is a novel or next-generation communication standard, the device 11 has only some of the layers that are compliant with the next-generation communication standard to be able to perform communication with the next-generation device 12. In other words, it is possible to develop the device 11 capable of communication with the next-generation device 12 in a shorter period of time and with a lower number of man-hours. In addition, it is possible to control the communication so as to maximize communication characteristics.

Second Embodiment

A description will be given of a second embodiment. Note that the following embodiments may also be considered to be, e.g., specific examples of the first embodiment.

Hereinafter, a terminal device 100 corresponds to the communication device 11, and a base station device 200 corresponds to the communication device 12 (counterpart communication device). For instance, each of the terminal device 100 and the base station device 200 may be referred to also as a communication device and, when one of the devices is referred to as the communication device, another of the devices may be referred to also as the counterpart communication device. Note that, in the following embodiments, a description will be given by using an example of communication between a base station and a terminal station but, in a case of, e.g., V2X communication, communication is performed between terminals, and no base station is present. In this case, the present embodiment is also applicable to the V2X communication by respectively replacing, in the sense that the terminals correspond to a controlling terminal and a terminal to be controlled, the base station device and the terminal device with the controlling terminal and the terminal to be controlled.

Figure 2:
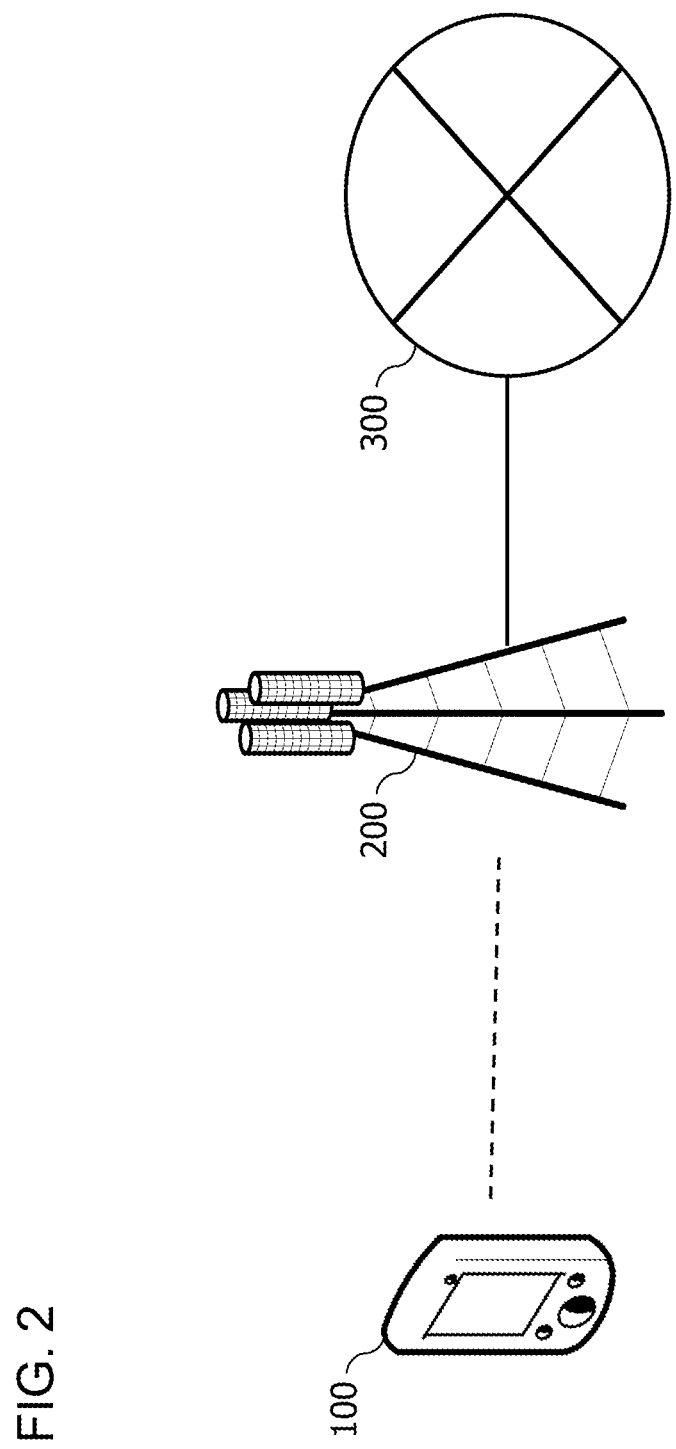
FIG. 2 is a figure illustrating an example of a configuration of the communication system 1.

FIG. 2 is a figure illustrating an example of a configuration of the communication system 10. The communication system 10 has the terminal device 100, the base station device 200, and a core network 300. The communication system 10 is a system in which the terminal device 100 communicates with another communication device on the core network 300 via the base station device 200.

The terminal device 100 is wirelessly connected to the base station device 200 to perform communication therewith. The terminal device 100 is, e.g., a tablet terminal or a smartphone compliant with both or one of 5G and B5G. The terminal device 100 may also have only some of the layers that are compliant with B5G or 5G. By way of example, B5G and 5G are mentioned but, in general, next-generation mobile communication BNG subsequent to an N-th generation and N-th generation mobile communication (NG) are mentioned.

The base station device 200 is a relay communication device that relays communication between the terminal device 100 and another device. For instance, the base station device 200 is a communication device compliant with both or one of 5G and B5G. The base station device 200 may also have only some of the layers that are compliant with B5G or 5G. By way of example, B5G and 5G are mentioned, but, in general, the next-generation mobile communication BNG subsequent to the N-th generation and the N-th generation mobile communication (NG) are mentioned.

The core network 300 is, e.g., a network that uses an IP (Internet Protocol) address to perform communication. The core network is, e.g., the Internet or a local network.

In the communication system 10, the generations with which the terminal device 100 and the base station device 200 are compliant are adjusted therebetween. For instance, the terminal device 100 notifies the base station device 200 of the generations and layers with which the host device is compliant. The base station device 200 selects, from among the generations and layers with which the terminal device 100 is compliant, the generation and layer to be used, and notifies the terminal device 100. This enables appropriate communication between the communication devices (the terminal device 100 and the base station device 200) compliant with the communication standards in the different generations. Specific examples of the notification of the generations and layers are given below. For instance, the terminal device uses a control signal referred to as UE capability to notify the base station device of information related to functions mounted therein (supported thereby or compliant therewith). The supported functions are able to be defined with, e.g., parameters. When the terminal device is compliant with B5G communication, the terminal device transmits a plurality of related B5G parameters. In a prominent example, when the base station device connected to the terminal device supports B5G and when the terminal supports only 5G, settings are transmitted from the base station device such that a B5G layer and a 5G layer are present in mixed relation in the terminal device. Note that UE capability is not necessarily needed, and the base station device may also transmit a request to the terminal device.

Example of Configuration of Base Station Device 200

Figure 3:
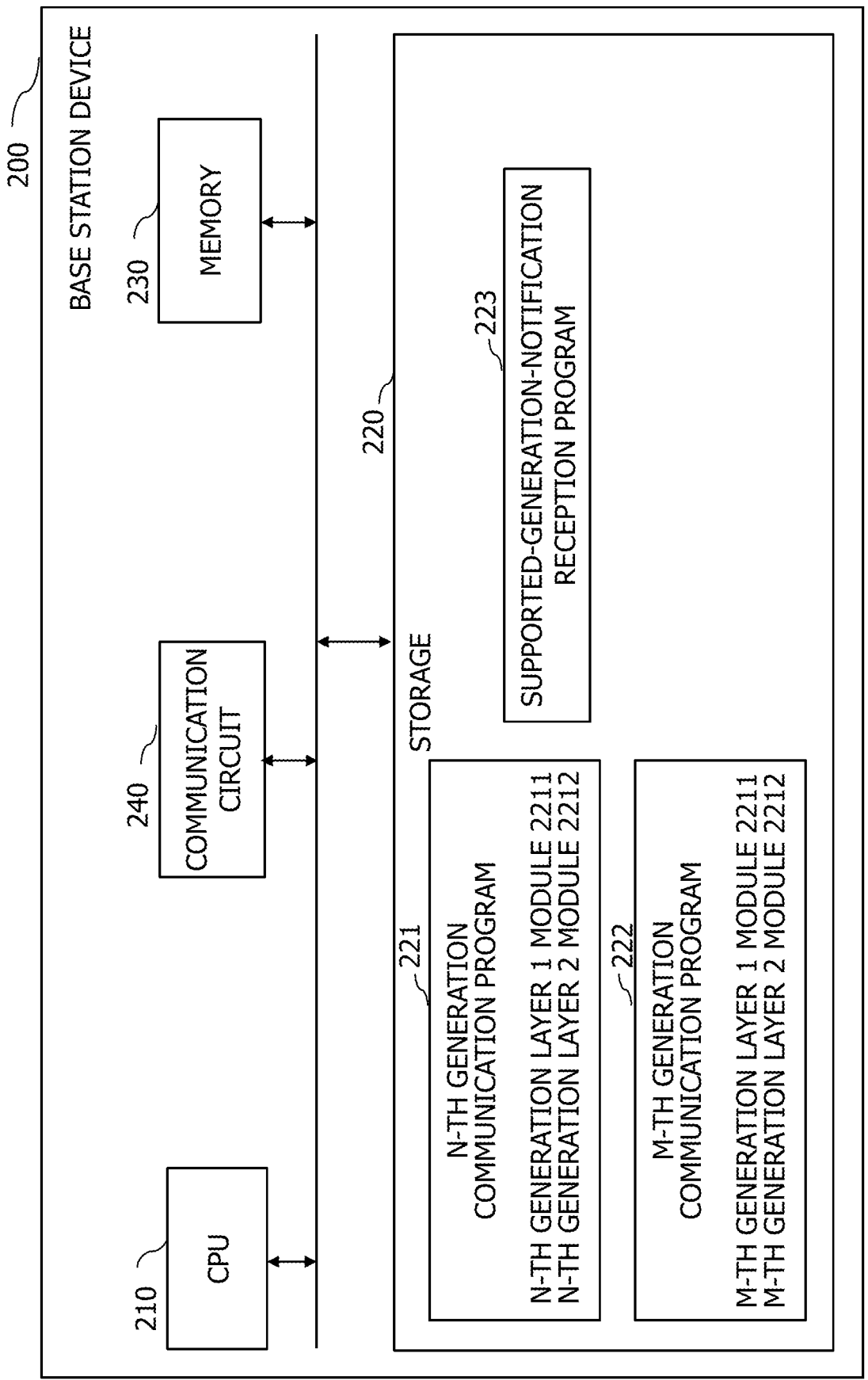
FIG. 3 is a figure illustrating an example of a configuration of the base station device 200.

FIG. 3 is a figure illustrating an example of a configuration of the base station device 200. The base station device 200 has a CPU (Central Processing Unit) 210, a storage 220, a memory 230, and a communication circuit 240.

The storage 220 is an auxiliary storage device that stores programs and data, such as a flash memory, a HDD (Hard Disk Drive), or an SSD (Solid State Drive). The storage 220 stores an N-th generation communication program 221, an M-th generation communication program 222, and a supported-generation-notification reception program 223.

The memory 230 is a region into which the programs stored in the storage 220 are to be loaded. The memory 230 may also be used as a region in which the programs store data.

The communication circuit 240 is a circuit that is connected to each of the terminal device 100 and the core network 300 to perform communication therewith. The communication circuit 240 that communicates with the terminal device 100 and the communication circuit 240 connected to the core network may also include a plurality of different communication circuits. For instance, the communication circuit 240 that communicates with the terminal device 100 may also be a device that supports wireless connection, while the communication circuit 240 that communicates with the core network 300 may also be a device that supports wired connection.

The CPU 210 is a processor that loads the programs stored in the storage 220 into the memory 230 and executes the loaded programs to build the individual entities and implement each processing.

The CPU 210 executes the N-th generation communication program 221 to build the communicator and the controller and perform N-th generation communication processing. The N-th generation communication processing is processing of performing communication compliant with an N-th generation communication standard. For instance, an N-th generation is 5G, B5G, 6G, or the like. The N-th generation may also be another generation or use another communication standard. Note that the N-th generation communication processing is divided into layers, and processing compliant with the N-th generation is performed for each of the layers.

The CPU 210 also executes an N-th generation layer 1 module 2211 included in the N-th generation communication program 221 to build the communicator and the controller and perform N-th generation layer 1 processing. The N-th generation layer 1 processing is processing of performing processing in the layer 1 compliant with the N-th generation communication standard. The layer 1 includes, e.g., a physical layer.

The CPU 210 also executes an N-th generation layer 2 module 2212 included in the N-th generation communication program 221 to build the communicator and the controller and perform N-th generation layer 2 processing. The N-th generation layer 2 processing is processing of performing processing in the layer 2 compliant with the N-th generation communication standard. The layer 2 includes, e.g., a data link layer. Note that, by way of example, a case where the layer 1 is a layer corresponding to a subordinate to the layer 2 will be described hereinbelow but, even when either of the layer 1 and the layer 2 is a superior or subordinate layer, equivalent processing is able to be performed.

The CPU 210 executes the M-th generation communication program 222 to build the communicator and the controller and perform M-th generation communication processing. The M-th generation communication processing is processing of performing communication compliant with an M-th generation communication standard. An M-th generation is, e.g., 5G, B5G, 6G, or the like. The M-th generation may also be another generation or may use another communication standard. Note that the M-th generation communication processing is divided into layers, and processing compliant with the M-th generation is performed for each of the layers. It is assumed that the M-th generation is a generation different from the N-th generation.

The CPU 210 executes an M-th generation layer 1 module 2221 included in the M-th generation communication program 222 to build the communicator and the controller and perform M-th generation layer 1 processing. The M-th generation layer 1 processing is processing of performing processing in the layer 1 compliant with the M-th generation communication standard. The layer 1 includes, e.g., a physical layer.

The CPU 210 executes an M-th generation layer 2 module 2222 of the M-th generation communication program 222 to build the communicator and the controller and perform M-th generation layer 2 processing. The M-th generation layer 2 processing is processing of performing processing in the layer 2 compliant with the M-th generation communication standard. The layer 2 includes, e.g., a data link layer. Note that, by way of example, a case where the layer 1 is a layer corresponding to a subordinate to the layer 2 will be described hereinbelow but, even when either of the layer 1 and the layer 2 is a superior or subordinate layer, equivalent processing is able to be performed.

The CPU 210 executes the supported-generation-notification reception program 223 to build the communicator and the controller and perform supported-generation-notification reception processing. The supported-generation-notification reception processing is processing of receiving, from the terminal device 100, a supported generation notification including support information related to supported generations and compliant layers. In the supported-generation-notification reception processing, the base station device 200 determines, from the support information from the terminal device 100, the generation to be used for communication for each of the layers (e.g., the layers 1 and 2), and notifies the terminal device 100.

Example of Configuration of Terminal Device 100

Figure 4:
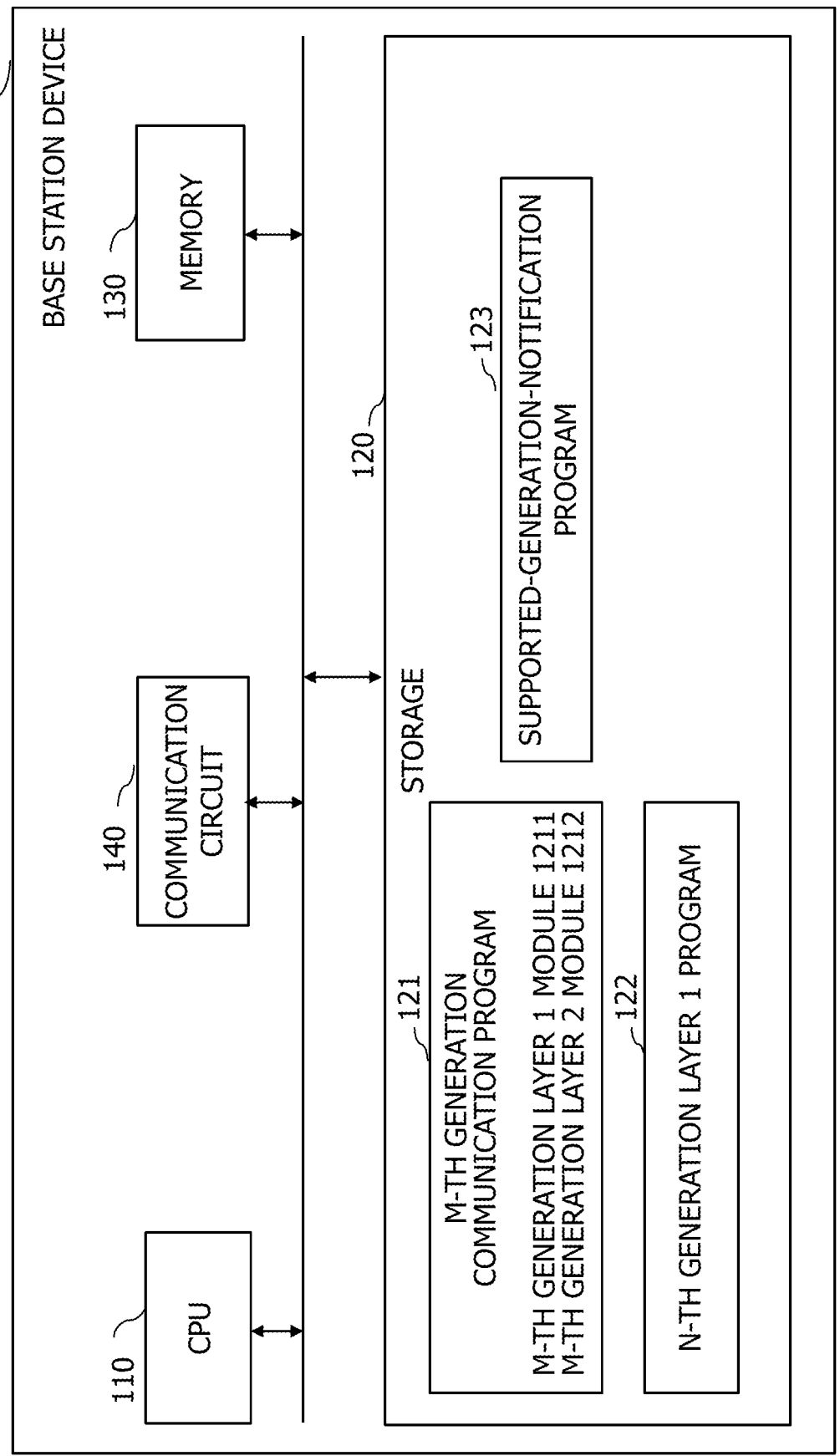
FIG. 4 is a figure illustrating an example of a configuration of the terminal device 100.

FIG. 4 is a figure illustrating an example of a configuration of the terminal device 100. The terminal device 100 has a CPU 110, a storage 120, a memory 130, and a communication circuit 140.

The storage 120 is an auxiliary storage device that stores programs and data, such as a flash memory, a HDD, or an SSD. The storage 120 stores a terminal M-th generation communication program 121, a terminal N-th generation layer 1 program 122, and a supported generation notification program 123.

The memory 130 is a region into which the programs stored in the storage 120 are to be loaded. The memory 130 may also be used as a region in which the programs store data.

The communication circuit 140 is a circuit connected to the base station device 200 to perform communication therewith. The communication circuit 140 is, e.g., a network card that supports wireless connection.

The CPU 110 is a processor that loads the programs stored in the storage 120 into the memory 130 and executes the loaded programs to build the individual entities and implement each processing.

The CPU 110 executes the terminal M-th generation communication program 121 to build a terminal communicator and a terminal controller and perform terminal M-th generation communication processing. The terminal M-th generation communication processing is processing of performing communication compliant with the M-th generation communication standard.

The CPU 110 executes a terminal M-th generation layer 1 module 1211 included in the terminal M-th generation communication program 121 to build the terminal communicator and the terminal controller and perform terminal M-th generation layer 1 processing. The terminal M-th generation layer 1 processing is processing of performing processing in the layer 1 compliant with the M-th generation communication standard.

The CPU 110 executes a terminal M-th generation layer 2 module 1212 included in the terminal M-th generation communication program 121 to build the terminal communicator and the terminal controller and perform terminal M-th generation layer 2 processing. The terminal M-th generation layer 2 processing is processing of performing processing in the layer 2 compliant with the M-th generation communication standard.

The CPU 110 executes the terminal N-th generation layer 1 program 122 to build the terminal communicator and the terminal controller and perform terminal N-th generation layer 1 processing. The terminal N-th generation layer 1 processing is processing of performing processing in the layer 1 compliant with the N-th generation communication standard.

The CPU 110 executes the supported generation notification program 123 to build the terminal controller and the terminal and perform supported generation notification processing. The supported generation notification processing is processing of transmitting, to the base station device 200, a supported generation notification including support generation related to the generations supported by the host device and the layers with which the host device is compliant. In FIG. 4, the terminal device 100 supports the M-th generation layers 1 and 2 and the N-th generation layer 1.

Generation Adjustment Processing

Figure 5:
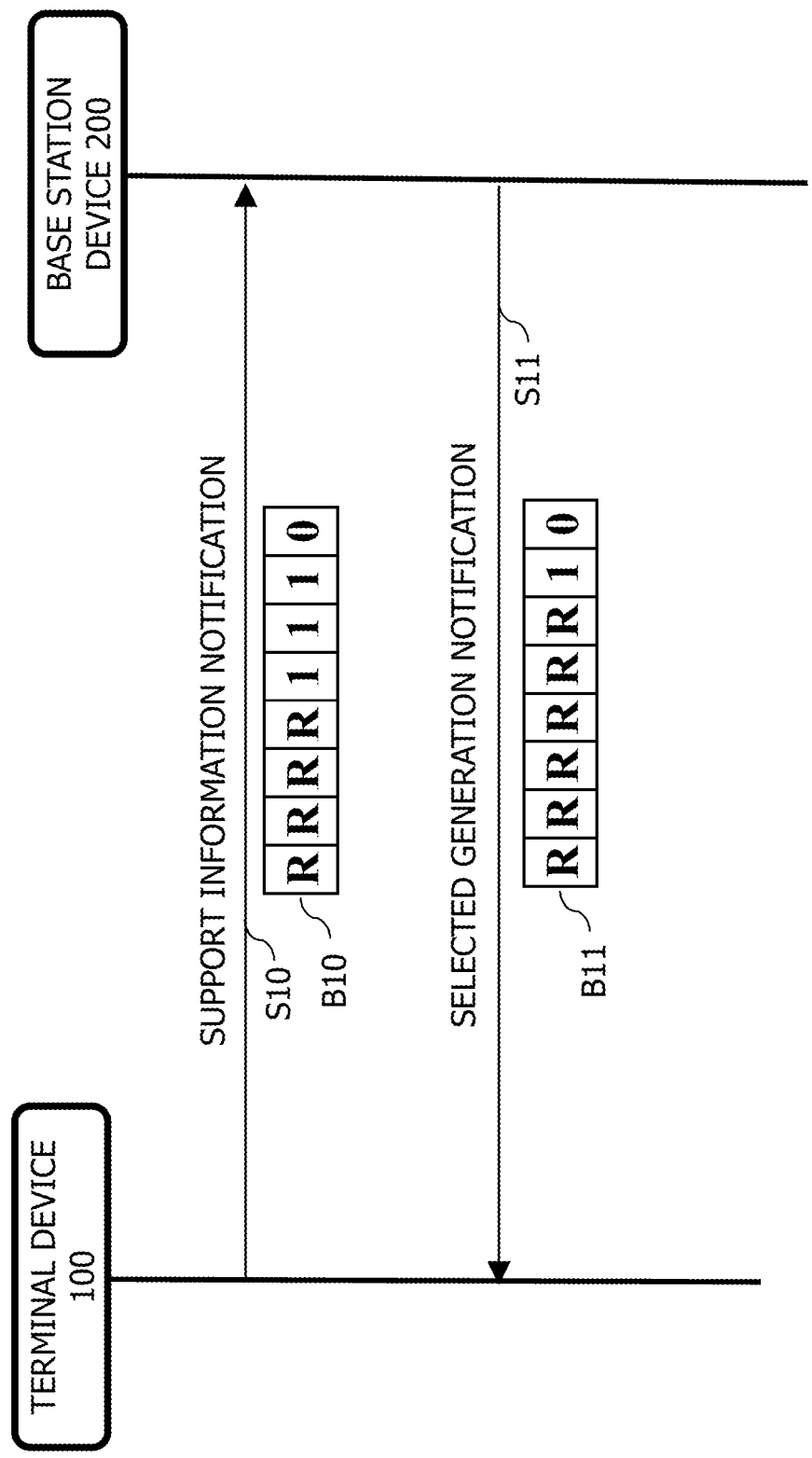
FIG. 5 is a figure illustrating an example of a sequence of generation adjustment processing.

FIG. 5 is a figure illustrating an example of a sequence of generation adjustment processing. The generation adjustment processing is processing in which the terminal device 100 and the base station device 200 which are in different generations adjust the generation for each of the layers.

The terminal device 100 transmits, to the base station device 200, a support information notification including a bit pattern B10 representing correspondence relationships between the generations and layers that are supported by the host device (S10). The support information notification may be transmitted as the UE capability signal described above, may be used as any RRC signal, or may be used as MAC CE. The support information notification may also be transmitted via PDCCH, though reliability of an error rate deteriorates. In the bit pattern B10, the four higher-order bits (the first to fourth bits) are R bits. The R bits are, e.g., reserved bits, which are bits not to be used or to be used for another use purpose.

FIG. 6 is a figure illustrating an example of the bit pattern representing the correspondence relationships between the supported generations and layers. In the bit pattern, the fifth to eighth four bits are used to represent the generations with which the layers 1 and 2 are compliant. When each of the bits is ON ("1"), "1" indicates that the bit supports the corresponding layer and generation. For instance, when the fifth bit is "1", "1" indicates that the 5G layer 1 is supported.

Returning to the sequence in FIG. 5, the bit pattern B10 represents that the terminal device 100 supports the 5G layer 1, the B5G layer 1, and the 5G layer 2. The bit pattern B10 also represents that the terminal device 100 does not support the B5G layer 2.

When receiving the support information notification (S10), the base station device 200 determines the generation of each of the layers to be used for communication on the basis of the generations and layers that are supported by the terminal device 100. Then, the base station device 200 transmits, to the terminal device 100, a selected generation notification including a bit pattern B11 representing correspondence relationships between the generations and layers that are to be used (S11). In the bit pattern B11, higher-order six bits (first to sixth bits) are the R bits.

FIG. 7 is a figure illustrating an example of the bit pattern representing correspondence relationships between the generations and layers that are to be used. In the bit pattern, the seventh and eighth two bits are used to represent the generations of the layers 1 and 2 to be used. Note that what is within each parentheses in INDEX represents the bit pattern of the target two bits, and each of 0x00 to 0x11 represents the generations of the layers 1 and 2. In FIG. 7, when the target 2 bits are, e.g., 0x00, 0x00 represents that each of the layers 1 and 2 uses what is in 5G.

Returning to the sequence in FIG. 5, the bit pattern B11 indicates that the base station device 200 has selected the B5G layer 1 and the 5G layer 2. In other words, the communication between the terminal device 100 and the base station device 200 is performed such that the layer 1 is compliant with the B5G communication standard, while the layer 2 is compliant with the 5G communication standard.

Development to Comply with Next-Generation Standard

It may take an enormous amount of time and a great number of man-hours to perform development to comply with the next-generation communication standard for all the layers. Accordingly, by making a notification of the supported generations and layers between the communication devices and allowing a selection to be made as in the second embodiment, it is possible to cause only a given layer to be compliant with the next-generation communication standard and reduce a development period and man-hours.

Figure 8:
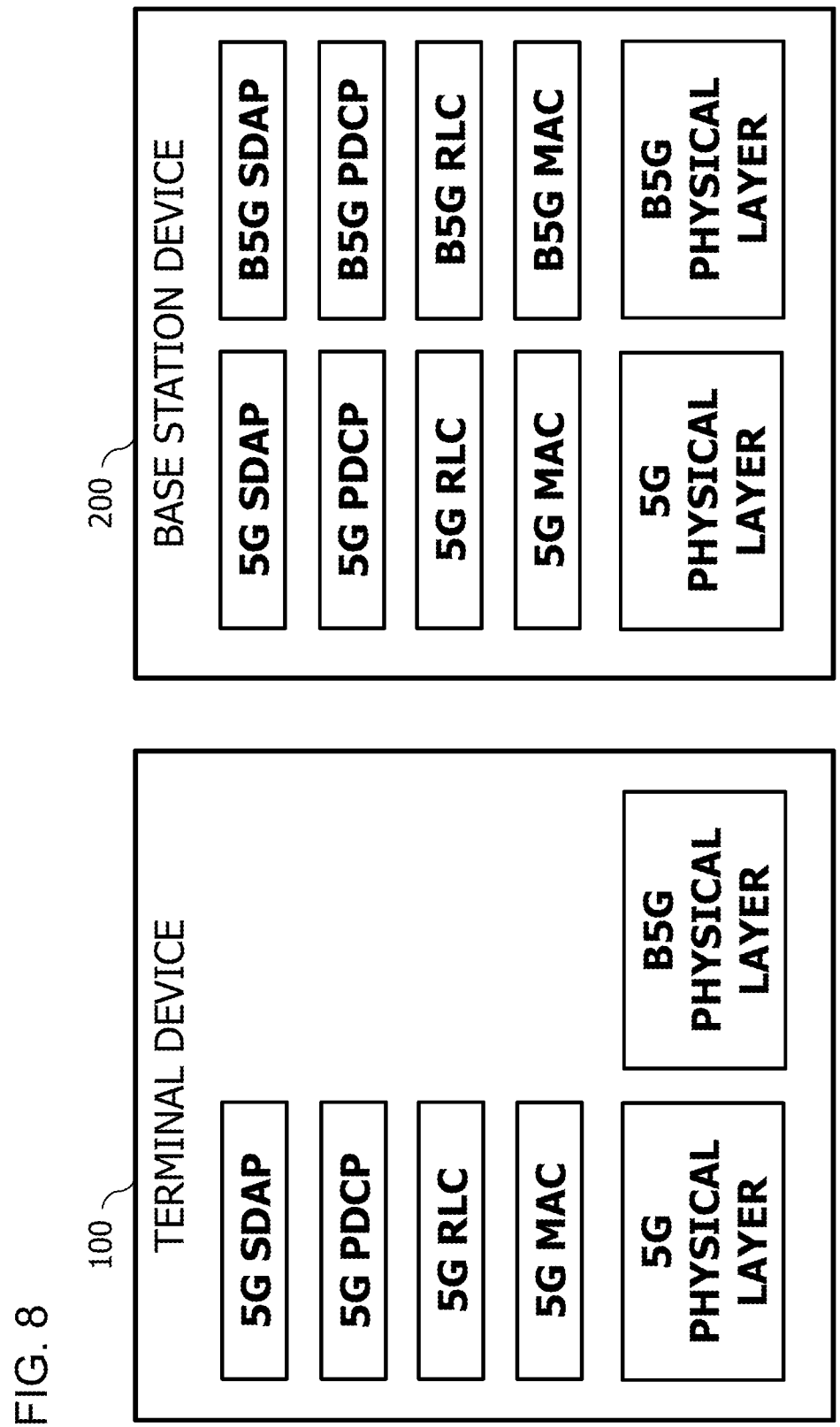
FIG. 8 is a figure illustrating an example of the generations and layers that are supported by the terminal device 100 and the base station device 200.

FIG. 8 is a figure illustrating an example of the generations and layers that are supported by the terminal device 100 and the base station device 200. The base station device 200 has conventionally (before development to comply with B5G) operated as a 5G-compliant base station device, and accordingly supports a 5G SDAP layer, a 5G PDCP layer, a 5G RLC layer, a 5G MAC layer, and a 5G physical layer. Then, the base station device 200 is developed so as to be compliant with B5G (processing for each of the layers compliant with the B5G is added thereto) and support a B5G SDAP layer, a B5G PDCP layer, a B5G RLC layer, a B5G MAC layer, and a B5G physical layer.

Meanwhile, in the terminal device 100, not all the layers are developed to be compliant with B5G and, for instance, only the layer 1 is compliant with B5G, and a B5G physical layer is added thereto. This is able to considerably reduce a development period and man-hours compared to those in a case where all the other layers are developed.

For instance, in the next-generation communication standard, due to a factor such as addition of a new frequency band, physically high-speed communication may be enabled. In this case, by causing only the physical layer to be compliant with the next generation, high-speed communication is enabled.

In addition, it is possible to control communication so as to maximize communication characteristics. For instance, in a case where a B5G traffic load is high, when a link layer protocol dedicated to B5G is used, resources such as a CPU and a memory may be used undesirably even though the performance thereof is not maximized. However, by utilizing a 5G link layer protocol, it is possible to save the B5G resources and, by allocating the resources to requiring traffic, it is possible to provide the traffic with QoS. There is also a case where 4G communication is performed by using the 5G link layer protocol, which is, e.g., a case where traffic is off-loaded. Using the link layer protocol dedicated to 5G for traffic to be serviced results in excessive performance, and therefore it is possible to save the 5G resources by off-loading the traffic to 4G. As a result, it is possible to maintain 5G coverage and capacity.

Third Embodiment

A description will be given of a third embodiment. In the third embodiment, the base station device 200 changes the generation to be used in response to, e.g., a status change or the like and notifies the terminal device 100.

Figure 9:
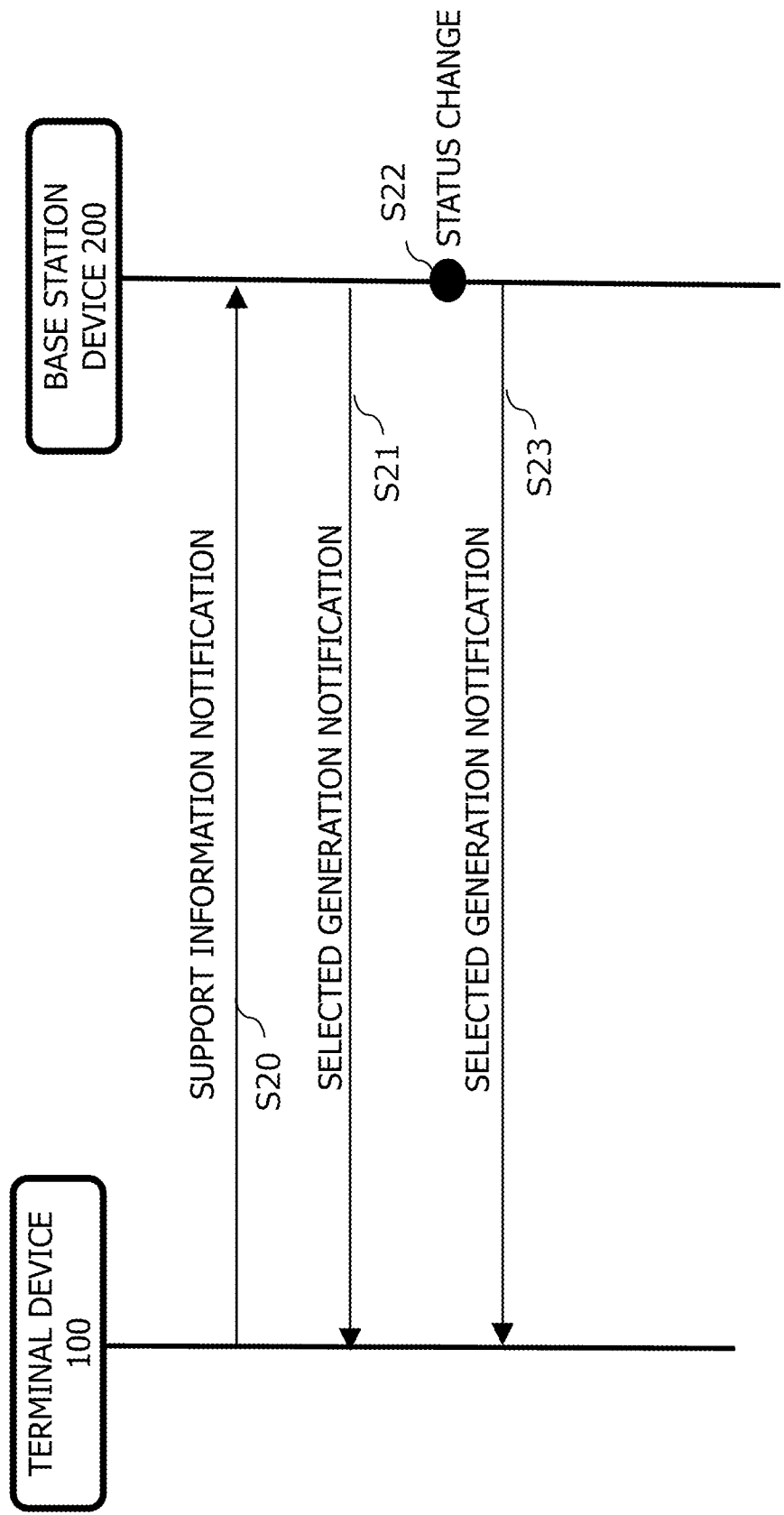
FIG. 9 is a figure illustrating an example of a sequence of a selected generation notification at the time of a status change.

FIG. 9 is a figure illustrating an example of a sequence of a selected generation notification at the time of a status change. The terminal device 100 transmits a support information notification to the base station device 200 (S20). The support information notification is the same as, e.g., the support information notification illustrated in FIG. 5.

When receiving the support information notification (S20), the base station device 200 determines the generation of each of the layers to be used for communication on the basis of the generations and layers that are supported by the terminal device 100. Then, the base station device 200 transmits the selected generation notification to the terminal device 100 (S21). The selected generation notification is the same as, e.g., the selected generation notification illustrated in FIG. 5.

When detecting a status change (S22), the base station device 200 changes the generation to be used, and notifies the terminal device 100 of the selected generation notification including the information (bit pattern) related to the changed generation (S23).

A status in the status change includes various statuses such as, e.g., QoS (such as a reception level, a degree of interference, and an amount of communication data), an amount of traffic, a system switching time such as handover, a power usage situation in the terminal device, and an amount of heat generation therefrom. The base station device 200 selects, e.g., the B5G layer 1 in processing S21. Then, when detecting a reduction in the B5G radio resources (such as an increased degree of interference or an increased amount of communication data in B5G) as the status change (S22), the base station device 200 makes a change such that the 5G layer 1 is used, and notifies the terminal device 100 in processing S23.

In the third embodiment, the base station device 200 selects the generation to be used in response to the status change, and notifies the terminal device 100. This allows the communication system 10 to select the generation according to the status, and is able to appropriately respond to the status change. Note that the selected generation notification in the processing S23 may also notify only the layers to be changed.

The selected generation notification is transmitted via, e.g., an RRC (Radio Resource Control) message. Alternatively, the selected generation notification is transmitted via a MAC CE (Control Element) message. Still alternatively, the selected generation notification is transmitted via a PDCCH (Physical Downlink Control Channel).

Meanwhile, the support information notification is transmitted via, e.g., UE capability. For instance, a default generation to be used is determined in advance between the communication devices, communication is performed in the generation determined in advance at the time of first connection, and communication is performed using the generation determined by the base station device 200 after reception of the support information notification.

Other Embodiments

The individual embodiments may also be combined with each other. For instance, either of the bit patterns in FIGS. 5 and 6 may be used.

In each of the embodiments, adjustment of another layer other than the layers 1 and 2 may also be made. As the compliant generation, another generation other than the two generations (5G and B5G) may also be a candidate for adjustment.

The terminal device 100 and the base station device 200 may also be reversed. The generations of the communication standards supported by the terminal device 100 and the base station device 200 may appropriately be different from each other, and which generation of the communication standard is supported by each of the devices does not matter.

The disclosure is able to suppress increases in construction period and development cost to respond to a generation change. The disclosure is also able to appropriately control a protocol or layer configuration according to a communication status.

All examples and conditional language provided herein are intended for the pedagogical purposes of aiding the reader in understanding the disclosure and the concepts contributed by the inventor to further the art, and are not to be construed as limitations to such specifically recited examples and conditions, nor does the organization of such examples in the specification relate to a showing of the superiority and inferiority of the disclosure. Although one or more embodiments of the present disclosure have been described in detail, it should be understood that the various changes, substitutions, and alterations could be made hereto without departing from the spirit and scope of the disclosure.

What is claimed is:

1. A communication device comprising:
a first wireless communication layer and a second wireless communication layer, each of the first wireless communication layer and the second wireless communication layer being compliant with a first communication standard of an N-th generation (N is an integer of 1 or more), and with a second communication standard of another generation different from the N-th generation;
communicator circuitry configured to perform wireless communication with another communication device via the first wireless communication layer; and
controller circuitry configured to:
select respective communication standards for the first wireless communication layer and the second wireless communication layer on the basis of communication standards of the first wireless communication layer and the second wireless communication layer, with each of which the another communication device is compliant, and
control communication such that data transmission and reception is performed using the first wireless communication layer and the second wireless communication layer which are compliant with the selected communication standards.

2. The communication device according to claim 1, wherein the communicator circuitry is further configured to receive information related to the communication standards of the first wireless communication layer and the second wireless communication layer, with which the another communication device is compliant.

3. The communication device according to claim 2, wherein the communicator circuitry is further configured to transmit, to the another communication device, information related to the selected communication standards.

4. The communication device according to claim 1, wherein
the first communication standard includes a fifth-generation communication standard, and
the second communication standard includes the fifth- and subsequent-generation communication standards.

5. The communication device according to claim 1, wherein, when detecting a first status change, the communicator circuitry is further configured to select again at least one of the respective communication standards of the first wireless communication layer and the second wireless communication layer.

6. The communication device according to claim 5, wherein the communicator circuitry is further configured to transmit, to the another communication device, information related to the communication standard selected again.

7. The communication device according to claim 5, wherein the first status change includes a change in a communication status between the another communication device and the communication device.

8. The communication device according to claim 5, wherein the first status change includes a change in a status of use of radio resources in the first communication standard or the second communication standard.

9. The communication device according to claim 2, wherein the information related to the communication standards of the first wireless communication layer and the second wireless communication layer, with each of which the another communication device is compliant, is included in UE capability.

10. The communication device according to claim 3, wherein the information related to the selected communication standards is transmitted using RRC (Radio Resource Control).

11. The communication device according to claim 3, wherein the information related to the selected communication standards is transmitted using MAC (Medium Access Control) CE (Control Element).

12. A communication device comprising:
a first wireless communication layer and a second wireless communication layer, each of the first wireless communication layer and the second wireless communication layer being compliant with at least one of a first communication standard of an N-th generation (N is an integer of 1 or more), and a second communication standard of another generation different from the N-th generation;
communicator circuitry configured to perform wireless communication with another communication device via the first wireless communication layer; and
controller circuitry configured to:
control communication such that data transmission and reception is performed using the first wireless communication layer and the second wireless communication layer which are compliant with communication standards selected by the another communication device on the basis of the communication standards of the first wireless communication layer and the second wireless communication layer with each of which a host communication device is compliant.

13. A communication system comprising:

a first communication device and a second communication device, the second communication device including:

a first wireless communication layer and a second wireless communication layer, each of the first wireless communication layer and the second wireless communication layer being compliant with a first communication standard of an N-th generation (N is an integer of 1 or more), and with a second communication standard of another generation different from the N-th generation, the first communication device including:

the first wireless communication layer and the second wireless communication layer, each of the first wireless communication layer and the second wireless communication layer being compliant with at least one of the first communication standard and the second communication standard, the second communication device performing wireless communication with the first communication device via the first wireless communication layer, the second communication device selecting respective communication standards for the first wireless communication layer and the second wireless communication layer on the basis of the communication standards of the first wireless communication layer and the second wireless communication layer, with each of which the first communication device is compliant and performing data transmission and reception by using the first wireless communication layer and the second wireless communication layer which are compliant with the selected communication standards, the first communication device performing the data transmission and reception by using the first wireless communication layer and the second wireless communication layer which are compliant with the communication standards selected by the second communication device.

\* \* \* \* \*